United States Patent [19]
King

[11] Patent Number: 5,967,535
[45] Date of Patent: Oct. 19, 1999

[54] SWIVEL WHEEL MOUNT

[75] Inventor: Nathanael Nelson King, Morgantown, Pa.

[73] Assignee: Graco Children's Products Inc., Elverson, Pa.

[21] Appl. No.: 08/911,285

[22] Filed: Aug. 14, 1997

[51] Int. Cl.⁶ .................................................. B62B 3/00
[52] U.S. Cl. ..................................... 280/47.38; 16/35 R
[58] Field of Search ..................... 280/33.992, 33.994, 280/642, 647, 657, 658, 47.34, 47.35, 47.38; 36/18 R, 19, 35 R, 35 D, 37

[56] References Cited

U.S. PATENT DOCUMENTS

| | | |
|---|---|---|
| 225,335 | 3/1880 | Brinton . |
| 309,273 | 12/1884 | Whitney . |
| 350,333 | 10/1886 | White . |
| 490,424 | 1/1893 | Chambers . |
| 539,080 | 5/1895 | Ordway . |
| 813,438 | 2/1906 | Landis . |
| 920,673 | 5/1909 | Sharon . |
| 950,545 | 3/1910 | Taubert . |
| 953,492 | 3/1910 | Sharon . |
| 1,092,808 | 4/1914 | Culver . |
| 1,489,672 | 4/1924 | Robertson . |
| 1,531,979 | 3/1925 | Robertson . |
| 1,614,894 | 1/1927 | Nelson et al. . |
| 1,630,421 | 5/1927 | George . |
| 1,671,774 | 5/1928 | McIntosh ............................. 188/1.12 |
| 1,861,919 | 6/1932 | Hill . |
| 2,096,239 | 10/1937 | Geyer ....................................... 16/18 |
| 2,253,824 | 8/1941 | Townsend et al. ...................... 16/35 |
| 2,263,717 | 11/1941 | Cleveland et al. ................... 244/104 |
| 2,271,304 | 1/1942 | Mulholland ............................. 16/44 |
| 2,345,442 | 3/1944 | Winter et al. ........................... 16/35 |
| 2,376,001 | 5/1945 | Nogle ................................. 280/33.4 |
| 2,458,922 | 1/1949 | Andresen ................................ 16/44 |
| 2,484,189 | 10/1949 | Shepherd ................................ 16/18 |
| 2,507,980 | 5/1950 | Knapp ................................. 280/701 |
| 2,539,108 | 1/1951 | Shepherd ................................ 16/18 |
| 2,543,948 | 3/1951 | Wiedman ................................ 16/44 |
| 2,707,795 | 5/1955 | Skupas ................................... 16/44 |
| 2,728,936 | 1/1956 | Hodges et al. ........................... 16/35 |
| 2,738,542 | 3/1956 | Clark, Jr. ................................ 16/44 |
| 2,774,313 | 12/1956 | Kurvers et al. ........................ 188/2 |
| 2,891,764 | 6/1959 | Pearne .................................. 254/1 |
| 2,915,776 | 12/1959 | Hanson et al. .......................... 16/44 |
| 2,923,961 | 2/1960 | Black ...................................... 16/44 |
| 2,942,290 | 6/1960 | Segal ...................................... 16/35 |
| 3,040,371 | 6/1962 | Rice et al. .............................. 16/31 |
| 3,054,135 | 9/1962 | Shepherd ................................ 16/18 |
| 3,060,488 | 10/1962 | Skupas ................................... 16/18 |
| 3,066,950 | 12/1962 | Olson et al. .......................... 280/179 |
| 3,075,231 | 1/1963 | Rice et al. .............................. 16/18 |
| 3,075,232 | 1/1963 | Rice et al. .............................. 16/18 |
| 3,124,922 | 3/1964 | Glass .................................... 56/377 |
| 3,128,495 | 4/1964 | Tooth ..................................... 16/43 |
| 3,176,340 | 4/1965 | Kramcsak, Jr. et al. ................ 16/18 |

(List continued on next page.)

FOREIGN PATENT DOCUMENTS 26 38 877   3/1977   Germany .

*Primary Examiner*—Richard M. Camby
*Attorney, Agent, or Firm*—Richard B. O'Planick

[57] ABSTRACT

Disclosed is a stroller including a frame member, a swivel mount adapted to receive the frame member, a swivel latch adapted to be received in the swivel mount, a suspension housing including a swivel latch receiving portion, the suspension housing adapted to be attached to the swivel mount, a swivel pin adapted to be received in the frame member, the swivel mount, and the suspension housing, and at least one wheel pivotally attached to the frame member. Also disclosed is a swivel wheel mount assembly, adapted to be mounted to a structure, including a swivel mount adapted to receive a portion of the structure, a swivel latch adapted to be received in the swivel mount, a suspension housing including a swivel latch receiving portion, the suspension housing adapted to be attached to the swivel mount, and a swivel pin adapted to be received in the portion of the structure, the swivel mount, and the suspension housing, wherein the swivel mount assembly is adapted to pivotally attach at least one wheel to the portion of the structure.

20 Claims, 11 Drawing Sheets

U.S. PATENT DOCUMENTS

| | | | |
|---|---|---|---|
| 3,177,516 | 4/1965 | Price et al. | 16/18 |
| 3,235,901 | 2/1966 | Rice et al. | 16/18 |
| 3,366,201 | 1/1968 | Pesta | 188/110 |
| 3,518,714 | 7/1970 | Hager | 16/35 |
| 3,623,575 | 11/1971 | Schiltigheim et al. | 188/31 |
| 3,670,361 | 6/1972 | Brassington et al. | 16/18 |
| 3,675,269 | 7/1972 | Closa | 16/18 A |
| 3,690,415 | 9/1972 | Nordskog | 188/69 |
| 3,967,342 | 7/1976 | Gebhard | 16/48 |
| 3,977,040 | 8/1976 | Sugasawara | 16/45 |
| 3,991,434 | 11/1976 | James | 16/18 A |
| 4,120,071 | 10/1978 | Crescenzi | 16/37 |
| 4,144,617 | 3/1979 | McCarroll | 16/18 |
| 4,229,856 | 10/1980 | Sparkes | 16/47 |
| 4,282,628 | 8/1981 | McCarroll | 16/18 A |
| 4,351,084 | 9/1982 | Fontana | 16/45 |
| 4,392,668 | 7/1983 | Mulholland | 280/721 |
| 4,467,496 | 8/1984 | Gregg | 16/18 B |
| 4,483,042 | 11/1984 | Dieter | 16/35 R |
| 4,491,335 | 1/1985 | Evron | 280/47.41 |
| 4,543,685 | 10/1985 | Kassai | 16/35 R |
| 4,567,964 | 2/1986 | Kassai | 188/20 |
| 4,570,288 | 2/1986 | Kassai | 16/35 R |
| 4,575,896 | 3/1986 | Nakao et al. | 16/35 R |
| 4,608,729 | 9/1986 | Huang | 16/35 R |
| 4,618,033 | 10/1986 | Kassai | 188/20 |
| 4,637,093 | 1/1987 | Kassai | 16/35 R |
| 4,649,596 | 3/1987 | Kassai | 16/35 R |
| 4,681,192 | 7/1987 | KJames | 188/1.12 |
| 4,714,141 | 12/1987 | Kassai | 188/20 |
| 4,731,899 | 3/1988 | Huang | 16/35 R |
| 4,759,098 | 7/1988 | Ko | 16/29 |
| 4,773,124 | 9/1988 | Nakao et al. | 16/35 R |
| 4,793,021 | 12/1988 | Deasy et al. | 16/37 |
| 4,805,259 | 2/1989 | Kassai | 16/35 R |
| 4,911,269 | 3/1990 | Perl | 188/1.12 |
| 4,913,452 | 4/1990 | Zun | 280/47.41 |
| 4,941,552 | 7/1990 | Screen | 188/1.12 |
| 4,953,667 | 9/1990 | Bigo | 188/31 |
| 5,040,265 | 8/1991 | France et al. | 16/35 R |
| 5,083,341 | 1/1992 | Milbredt et al. | 16/35 R |
| 5,144,717 | 9/1992 | Siesholtz et al. | 16/47 |
| 5,172,451 | 12/1992 | Chiu | 16/35 R |
| 5,191,674 | 3/1993 | Zun | 16/35 R |
| 5,191,675 | 3/1993 | Ishikura | 16/35 R |
| 5,215,356 | 6/1993 | Lin | 301/111 |
| 5,224,961 | 7/1993 | Lin | 301/111 |
| 5,234,226 | 8/1993 | Liu | 280/642 |
| 5,277,480 | 1/1994 | Chiu | 301/111 |
| 5,303,449 | 4/1994 | Gray | 16/18 CG |
| 5,351,364 | 10/1994 | Zun | 16/35 R |
| 5,408,723 | 4/1995 | Julien et al. | 16/30 |

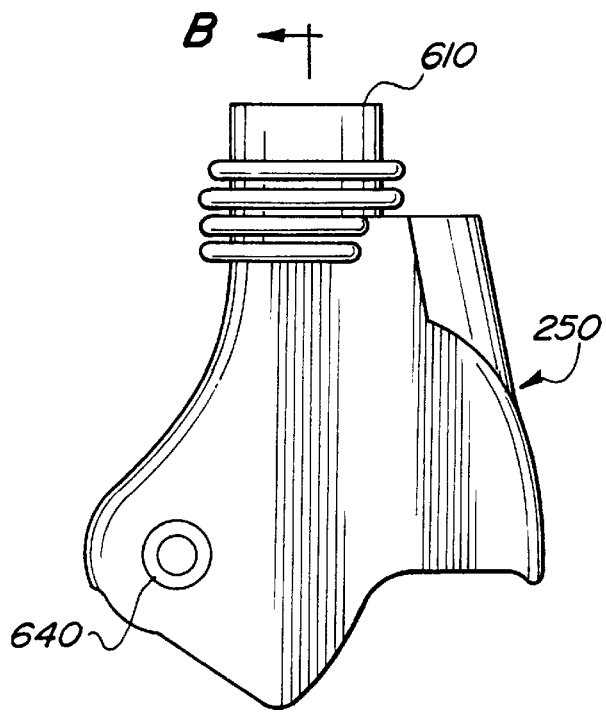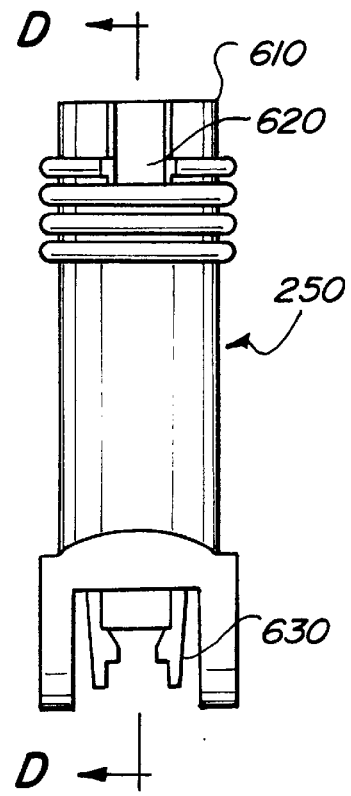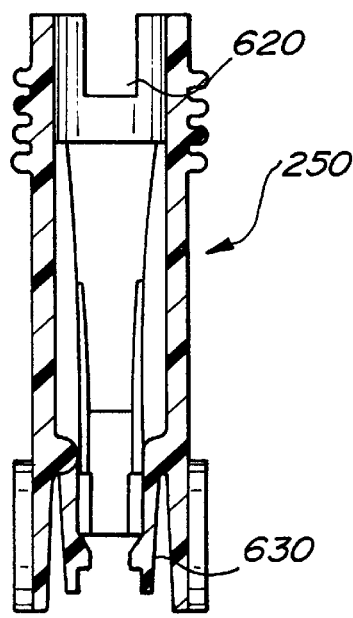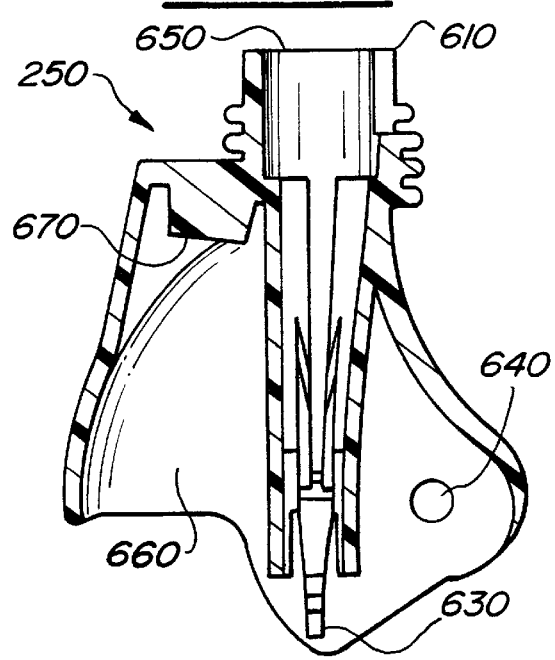
Fig-6A
Fig-6C
Fig-6B
Fig-6D

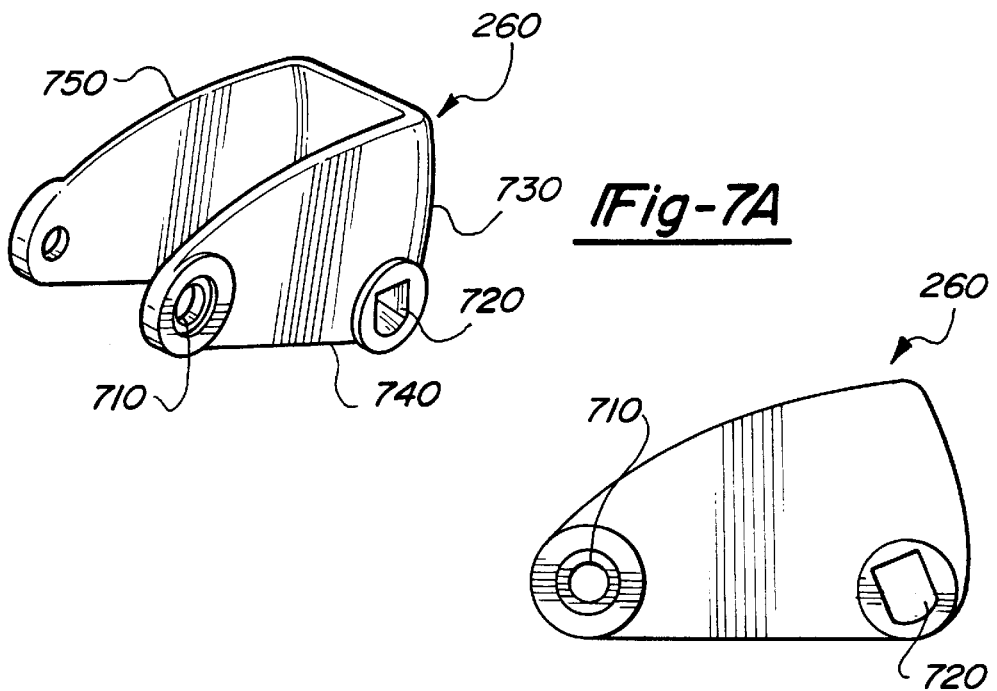
*Fig-7A*
*Fig-7B*
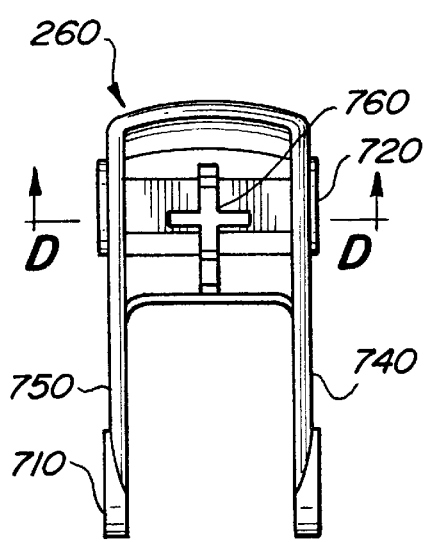
*Fig-7C*
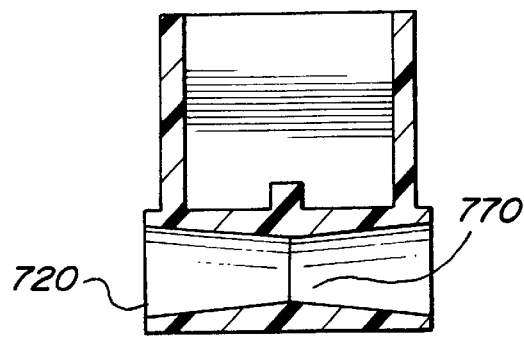
*Fig-7D*

SWIVEL WHEEL MOUNT

BACKGROUND OF THE INVENTION

1. Field of Invention

The present invention relates to a child's stroller (a bassinet, a baby buggy or similar device used to support or transport a person) with wheels which swivel.

2. Description of Related Art

Conventional transporters with swivel wheels suffer from several disadvantages. In the past, wheels were rigidly fixed to the transporters on which they were used. This makes the transporter extremely bulky and very expensive to ship.

Later, wheels became removable. Although this technique reduced bulk, conventional removable swivel wheel attachment mechanisms suffer from several disadvantages. These separately shipped items proved difficult for consumers to attach to the transporter. Attachment required the use of several different tools (screwdrivers, wrenches, etc.), as well as several different types of fasteners (screws, bolts, nuts, etc.). Also, because the consumer was responsible for fastening the swivel wheel to the frame of the transporter, the rigidity of this connection varied from transporter to transporter. Finally, conventional removable swivel wheel attachment mechanisms caused the swivel wheel to be attached, via a fastener, to a wheel mount fastened off of the end of a frame member on the transporter. Thus, these conventional removable swivel wheel attachment mechanisms relied on the rigidity of the wheel mount for the stable support of the swivel wheels. Therefore, the natural rigidity of the frame member on the transporter is not relied upon for the stable support the swivel wheels.

Accordingly, there is a need for an improved transporter (a child's stroller, a bassinet, a baby buggy, or similar device used to support or transport a person) with a swivel wheel mount which is both rigid and easy for the consumer to assemble/replace.

SUMMARY OF THE INVENTION

Accordingly, the present invention is directed to an improved transporter (a child's stroller, a bassinet, a baby buggy, or similar device used to support or transport a person) with a swivel wheel mount which substantially eliminates one or more of the problems or disadvantages found in the prior art.

An object of the present invention is to provide an assembly which improves packing efficiency.

Another objective of the present invention is to provide for easy attachment of the swivel wheels without the use of tools.

Another objective of the present invention is to provide for easy removal of the swivel wheels through the use of simple tools.

Another objective of the present invention is to provide for easy replacement of the swivel wheels and wheel mount components through the use of simple tools and without the use of conventional fasteners.

Another object of the present invention is to allow easy and reliable installation of the swivel wheels.

Another object of the present invention is to accommodate slight differences in manufacturing from unit to unit.

Another object of the present invention is to reduce the cost and complexity of manufacturing the transporter and its various components.

Another object of the invention is to strengthen the connection of the swivel wheels to the transporter.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the invention includes a stroller including a frame member, a swivel mount adapted to receive the frame member, a swivel latch adapted to be received in the swivel mount, a suspension housing including a swivel latch receiving portion, the suspension housing adapted to be attached to the swivel mount, a swivel pin adapted to be received in the frame member, the swivel mount, and the suspension housing, and at least one wheel pivotally attached to the frame member.

In another aspect, the invention includes swivel wheel mount assembly, adapted to be mounted to a structure, including a swivel mount adapted to receive a portion of the structure, a swivel latch adapted to be received in the swivel mount, a suspension housing including a swivel latch receiving portion, the suspension housing adapted to be attached to the swivel mount, and a swivel pin adapted to be received in the portion of the structure, the swivel mount, and the suspension housing, wherein the swivel mount assembly is adapted to pivotally attach at least one wheel to the portion of the structure.

It is to be understood that both the general description above, and the following detailed description are exemplary and explanatory and are intended to provide further explanation of the invention as claimed.

BRIEF DESCRIPTION OF THE DRAWINGS

The accompanying drawings which are included to provide a further understanding of the invention and constitute a part of this specification, illustrate embodiments of the invention and together with the written description, serve to explain the principles of the invention. In the drawings:

FIG. 6A is a side view of a preferred leading housing in accordance with the present invention;

FIG. 6B is a sectional view of a preferred leading housing in accordance with the present invention taken along line B—B in FIG. 6A;

FIG. 6C is a rear view of a preferred leading housing in accordance with the present invention;

FIG. 6D is a sectional view of a preferred leading housing in accordance with the present invention taken along line D—D in FIG. 6C;

FIG. 7A is an isometric front view of a preferred trailing housing in accordance with the present invention;

FIG. 7B is a side view of a preferred trailing housing in accordance with the present invention;

FIG. 7C is a top view of a preferred trailing housing in accordance with the present invention;

FIG. 7D is a sectional view of a preferred trailing housing in accordance with the present invention taken along line D—D of FIG. 7C;

DETAILED DESCRIPTION OF THE PREFERRED EMBODIMENTS

Reference will now be made in detail to the preferred embodiments of the present invention, examples of which are illustrated in the accompanying drawings.

Figure 1A:
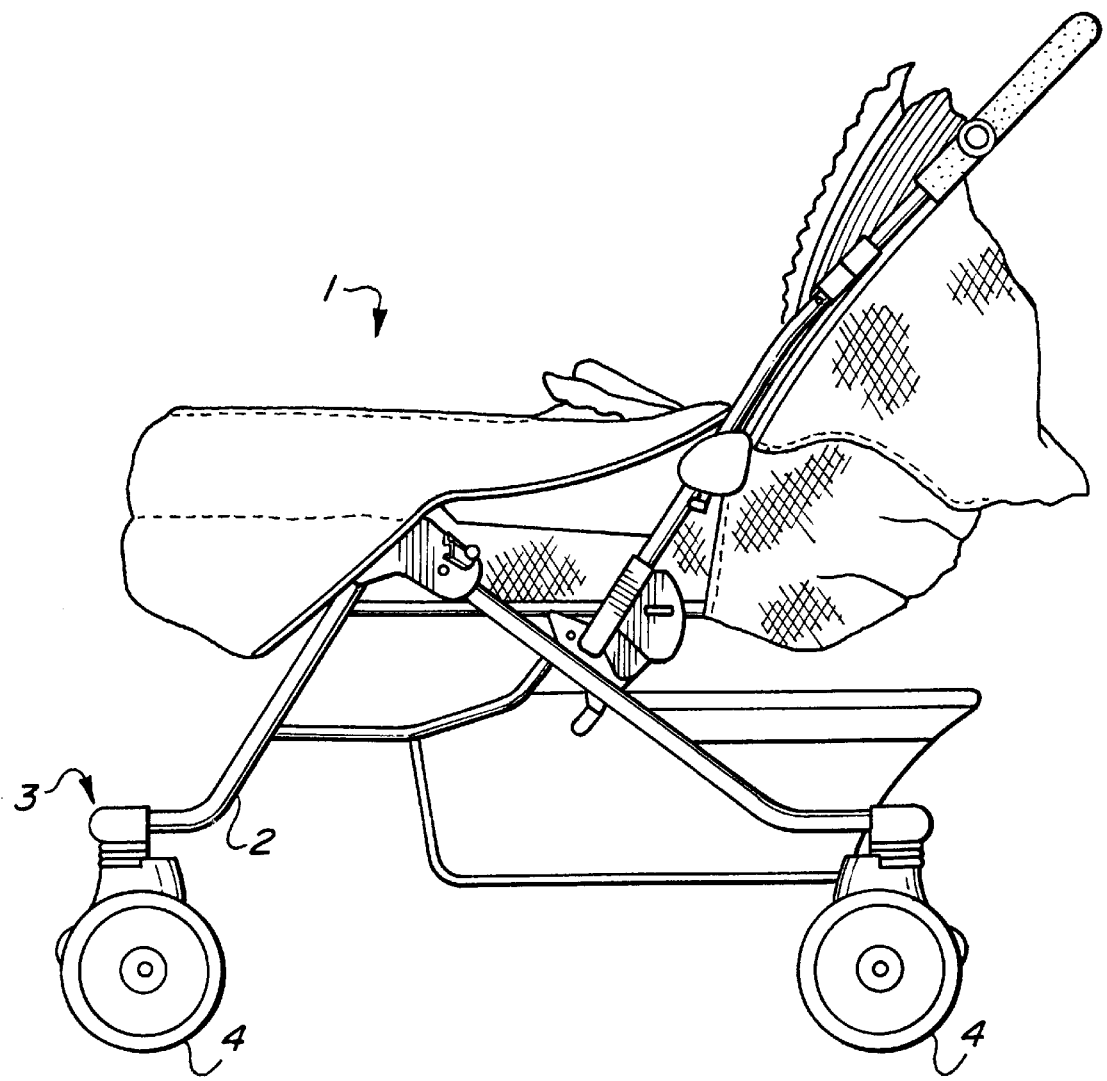
FIG. 1A is a side view of a stroller according to a preferred embodiment of the present invention.

In accordance with the objects of the present invention, the stroller of the present invention includes a frame member, a swivel mount adapted to receive the frame member, a swivel latch adapted to be received in the swivel mount, a suspension housing comprising a swivel latch receiving portion, the suspension housing adapted to be attached to the swivel mount, a swivel pin adapted to be received in the frame member, the swivel mount, and the suspension housing, and at least one wheel pivotally attached to the frame member. For example, FIG. 1A shows a side view of a stroller according to a preferred embodiment of the present invention.

Stroller 1 includes frame 2 and wheels 4. Of course, it should be understood that frame 2 could comprise any appropriate configuration provided that the frame includes an appropriate member for receiving wheels 4. According to a preferred embodiment of the present invention, stroller 1 includes two swivel wheel assemblies 3 attached to the front portion of the stroller. However, it should be understood that swivel wheel assemblies 3 could be attached to both the front and rear of the stroller. Frame 2 and its various components may be constructed of any appropriate rigid material. For example, frame 2 may be constructed of metal or a high-strength plastic. Preferably, frame 2 may be constructed of metal tubing or an injection molded plastic. Finally, although the present invention is shown as a bed-type stroller, the fundamentals of the present invention are equally applicable to a bassinet, a baby buggy, or similar device used to support or transport a person.

Figure 1B:
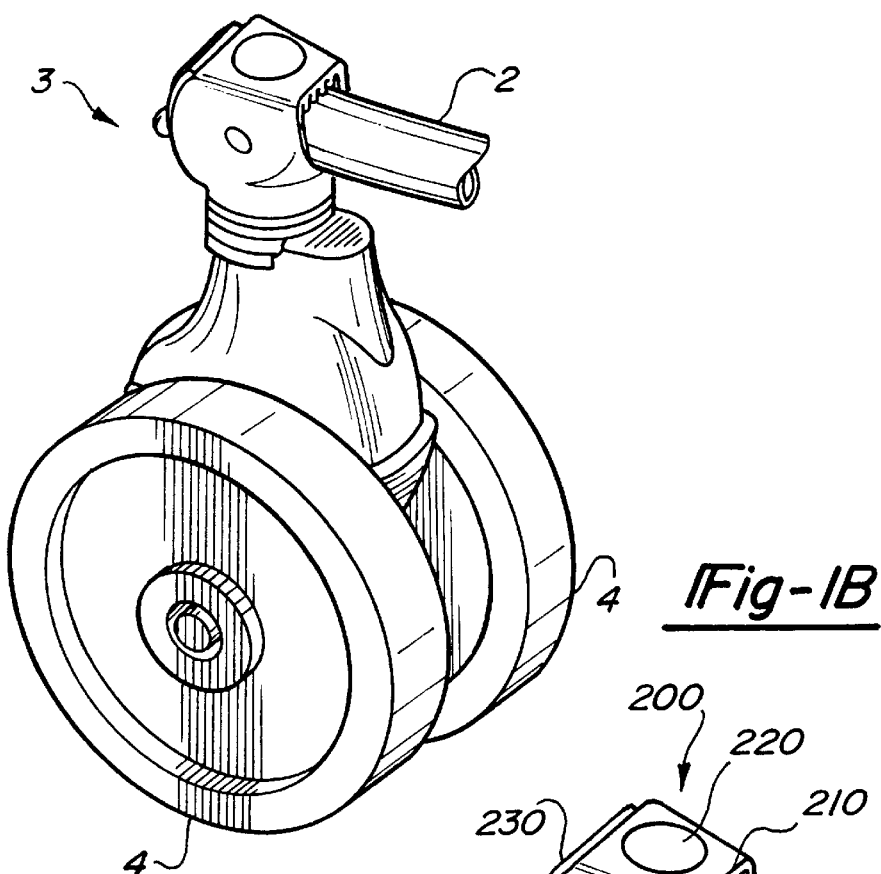
FIG. 1B is an enlarged isometric view of a preferred swivel wheel assembly in accordance with the present invention.

FIG. 1B shows an enlarged isometric view of a preferred swivel wheel assembly in accordance with the present invention. As can be seen in this enlarged view, swivel wheel assembly 3 of the present invention is attached to a portion of frame 2. Although the preferred swivel wheel assembly in accordance with the present invention is shown with two wheels, it should be understood that a swivel wheel assembly with a single wheel could also be utilized.

Figure 2:
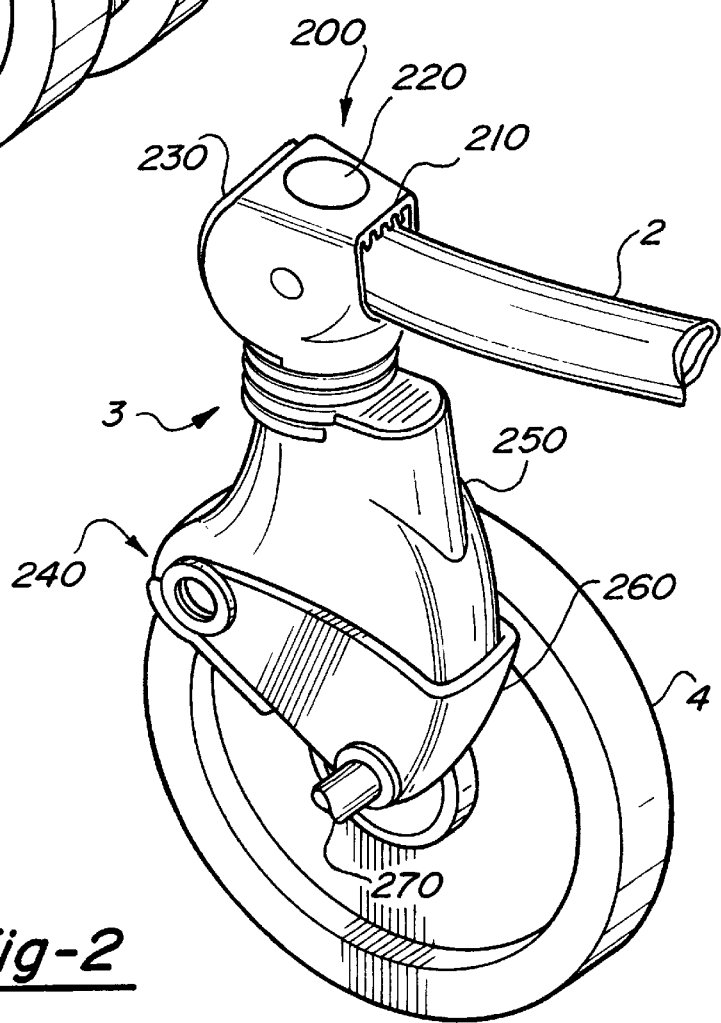
FIG. 2 is an enlarged isometric view of a portion of a preferred swivel wheel assembly in accordance with the present invention.

FIG. 2 shows an enlarged isometric view of a portion of a preferred swivel wheel assembly in accordance with the present invention. The swivel wheel assembly 3 of the present invention includes swivel wheel mounting assembly 200, swivel wheel mount 210, swivel pin 220, swivel latch 230, suspension housing 240, and wheel axle 270. The suspension housing of the stroller according to the present invention comprises a leading housing and a trailing housing. For example, as shown in FIG. 2, suspension housing 240 is made up of leading housing 250 and trailing housing 260.

Figure 3:
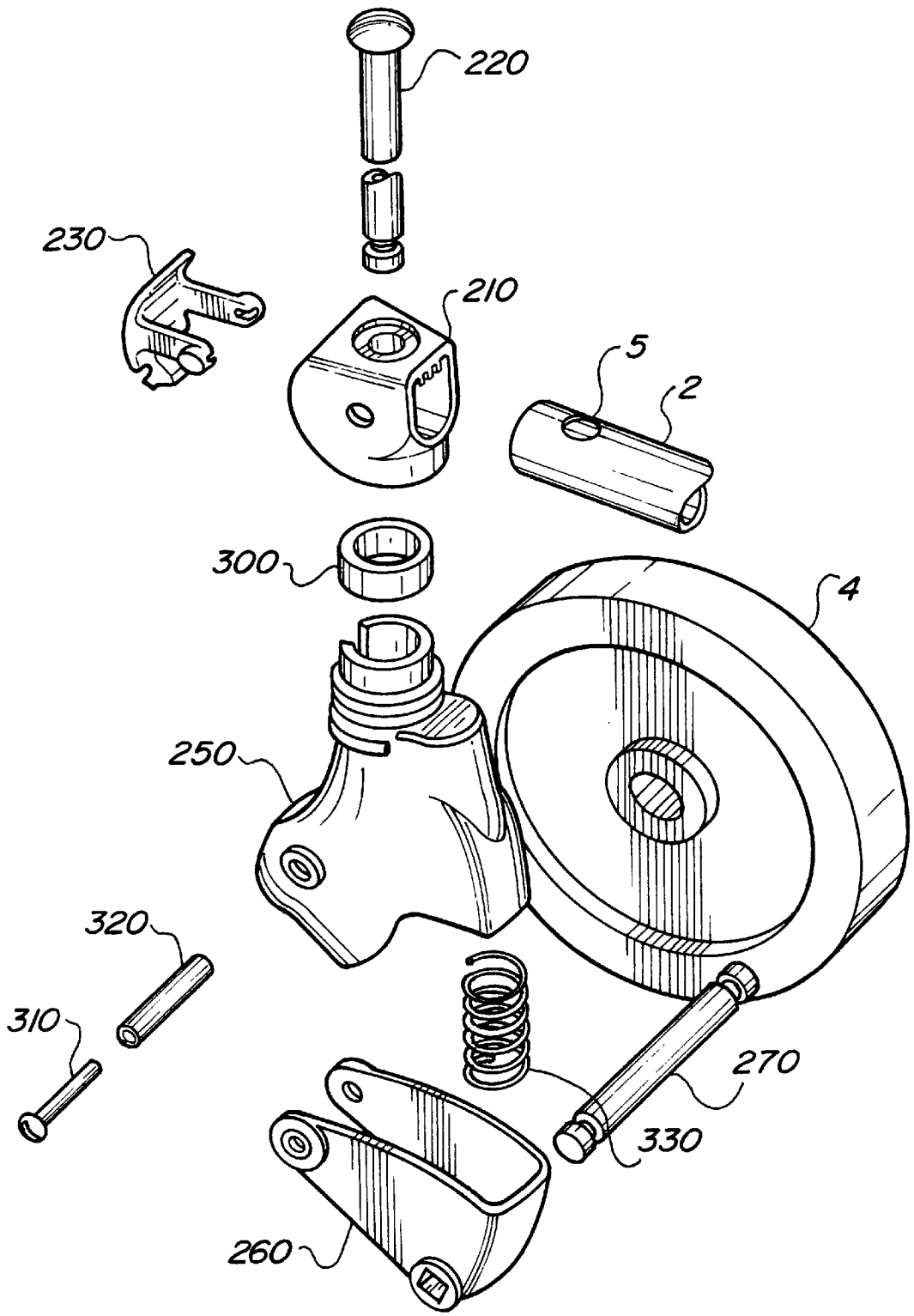
FIG. 3 is an exploded isometric view of a portion of a preferred swivel wheel assembly in accordance with the present invention.

The swivel mount of the preferred stroller according to the present invention includes first and second bores, wherein the second bore is adapted to receive an end of the frame member and the swivel latch. For example, as shown in FIG. 3, swivel mount 210 is adapted to receive a swivel pin 220 through a first bore, and an end of frame 2 and swivel latch 230 in a second bore. Swivel pin 220 is adapted to pass through transverse bore 5 of frame 2. Swivel bushing 300 is adapted to be sandwiched between swivel mount 210 and leading housing 250. Swivel bushing 300 may be constructed of any appropriate rigid, friction resistant material, preferably a high-strength plastic, and more preferably an injection-molded plastic. Trailing housing 260 is attached to leading housing 250 via suspension housing pin 310 and sleeve 320. Suspension spring 330 is received between leading housing 250 and trailing housing 260. Wheel 4 is attached to trailing housing 260 via wheel axle 270.

Figure 4A:
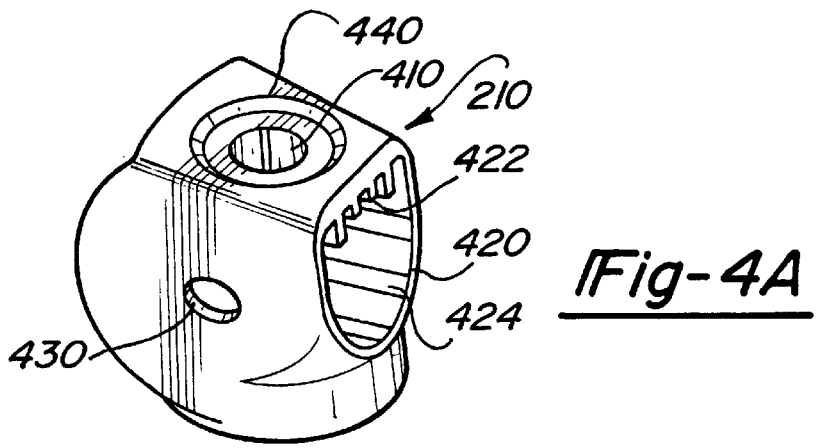
FIG. 4A is an isometric front view of a preferred swivel mount in accordance with the present invention.

The swivel mount of the preferred stroller according to the present invention includes first and second bores, the first bore extending completely through the swivel mount and the second bore extending at least partially through the swivel mount, wherein the second bore is perpendicular to the first bore and is adapted to receive an end of the frame member and the swivel latch. For example, as shown in FIG. 4A, swivel mount 210 includes first bore 410, second bore 420, latch tab receiving holes 430, and swivel pin recess portion 440. Second bore 420 includes raised ridges 422 and 424 to provide a snug fit for an end of frame 2. Swivel mount 210 may be constructed of any appropriate rigid material, preferably a high-strength plastic, and more preferably an injection-molded plastic.

Figure 4B:
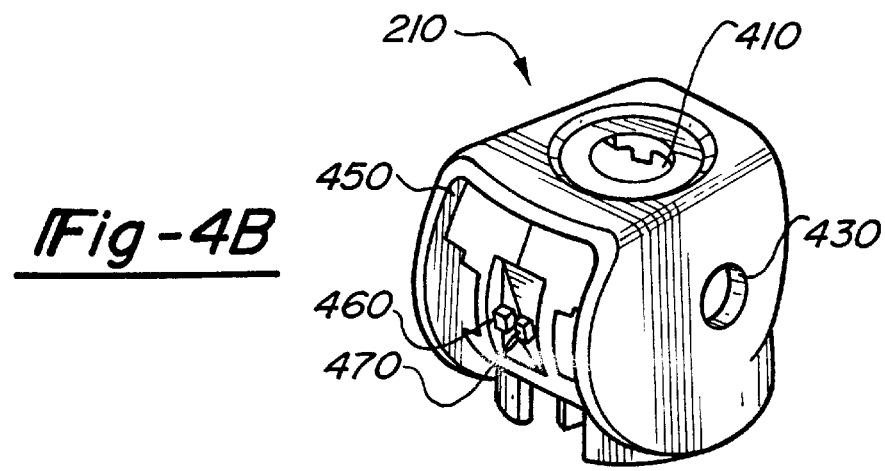
FIG. 4B is an isometric rear view of a preferred swivel mount in accordance with the present invention.

The swivel mount of the preferred stroller according to the present invention includes swivel latch engaging tabs to engage the swivel latch in an open position and a locked position, wherein in the locked position, a swivel latch receiving portion of the suspension housing receives the swivel latch. For example, FIG. 4B shows swivel latch receiving recess 450, as well as swivel latch engaging tabs 460 and 470. First swivel latch engaging tab 460 comprises a triangular cantilevered portion extending from a lower portion of swivel mount 210, while second swivel latch engaging tab 470 comprises a triangular cantilevered portion extending from a upper portion of swivel mount 210. Swivel latch engaging tabs 460 and 470 each further comprise rectangular projections for engaging a rear surface of swivel latch 230. Although swivel latch engaging tabs 460 and 470 are shown as triangular, it should be understood that the are adapted to cooperate with a rear surface of the swivel latch and could comprise any geometry which facilitates engagement of the swivel latch in locked and unlocked positions.

Figure 4C:
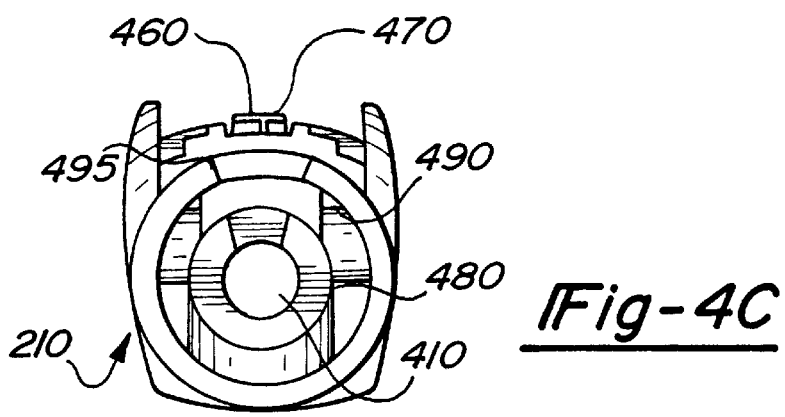
FIG. 4C is a bottom view of a preferred swivel mount in accordance with the present invention.

FIG. 4C is a bottom view of a preferred swivel mount in accordance with the present invention. The rectangular projections of swivel latch engaging tabs 460 and 470 can be clearly seen in this bottom view. Bottom swivel surface 480 is adapted to abut swivel bushing 300, while recess 490 is adapted to receive a top portion of leading housing 250. Opening 495 is adapted to receive a lock projection of swivel latch 230 (see FIGS. 8 and 9).

Figure 5A:
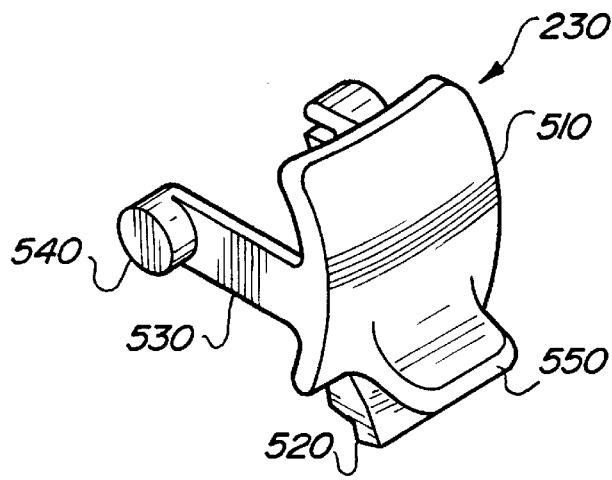
FIG. 5A is an isometric front view of a preferred swivel latch in accordance with the present invention.

FIG. 5A shows an isometric front view of a preferred swivel latch in accordance with the present invention. Swivel latch 230 includes front face 510, lock projection 520, arms 530, rotation tabs 540, and button 550. Front face 510 is designed to be flush mounted within swivel latch receiving recess 450 of swivel mount 210, while rotation tabs 540 are adapted to be received in latch tab receiving holes 430 of swivel mount 210. Swivel latch 230 may be constructed of any appropriate rigid material, preferably a high-strength plastic, and more preferably an injection-molded plastic.

Figure 5B:
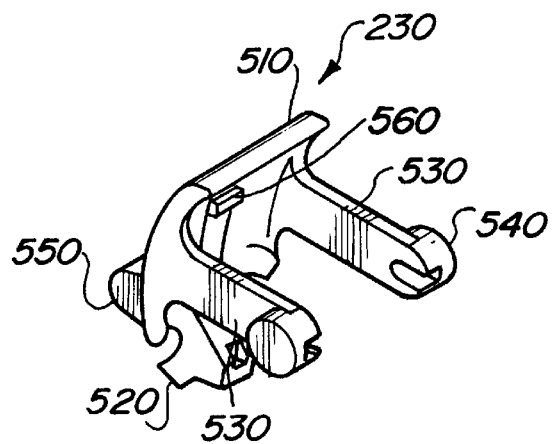
FIG. 5B is an isometric rear view of a preferred swivel latch in accordance with the present invention.
Figure 5C:
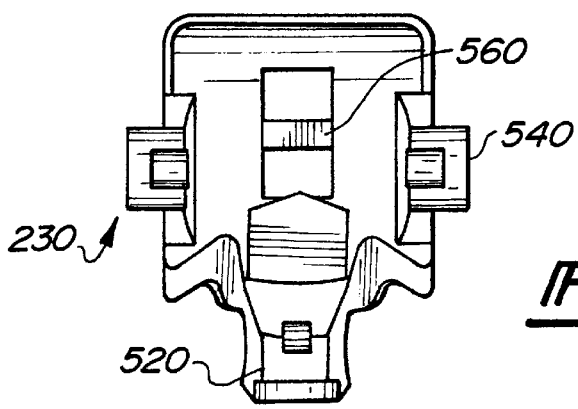
FIG. 5C is a rear view of a preferred swivel latch in accordance with the present invention.

FIG. 5B shows an isometric rear view of a preferred swivel latch in accordance with the present invention, while FIG. 5C shows a rear view of a preferred swivel latch in accordance with the present invention. As can be seen most clearly in FIGS. 5B and 5C, swivel latch 230 further comprises a rear engaging projection 560 which is adapted to cooperate with swivel latch engaging tabs 460 and 470 to facilitate engagement of the swivel latch in locked and unlocked positions.

FIG. 6A shows a side view of a preferred leading housing in accordance with the present invention. Leading housing 250 comprises top swivel surface 610 and suspension pin bore 640. Top swivel surface 610 is adapted to abut swivel bushing 300. Leading housing 250 may be constructed of any appropriate rigid material, preferably a high-strength plastic, and more preferably an injection-molded plastic.

FIG. 6B shows a sectional view of a preferred leading housing in accordance with the present invention taken along line B-B in FIG. 6A. Leading housing 250 further comprises swivel latch receiving portion 620 and swivel pin receiving tabs 630. Swivel latch receiving portion 620 is adapted to receive lock projection 520 of swivel latch 230 in the locked position. Swivel pin receiving tabs 630 are designed to engage the bottom of swivel pin 220 so that the consumer may attach swivel wheel assembly 3 to stroller 1 without the use of tools or conventional fasteners.

FIG. 6C shows a rear view of a preferred leading housing in accordance with the present invention. FIG. 6C shows top swivel surface 610, swivel latch receiving portion 620, and swivel pin receiving tabs 630.

FIG. 6D shows a sectional view of a preferred leading housing in accordance with the present invention taken along line D—D in FIG. 6C. FIG. 6D shows top swivel surface 610, swivel pin receiving tabs 630, suspension pin bore 640, swivel pin receiving bore 650, spring receiving recess 660, and spring receiving tab 670. When assembled, suspension spring 330 is seated on spring receiving tab 670 and extends at an angle into spring receiving recess 660. Suspension pin bore 640 is adapted to receive suspension housing pin 310 and sleeve 320.

The trailing housing of the preferred stroller according to the present invention includes an over-drafted axle bore adapted to allow the wheel to be semi-rigidly attached to the suspension housing. For example, as shown in FIG. 7A, trailing housing 260 includes over-drafted axle bore 720. Trailing housing 260 also includes suspension pin receiving bore 710, rear portion 730, and side portions 740 and 750. FIG. 7B more clearly shows over-drafted axle bore 720. Trailing housing 260 may be constructed of any appropriate rigid material, preferably a high-strength plastic, and more preferably an injection-molded plastic.

FIG. 7C shows a top view of a preferred trailing housing in accordance with the present invention. This figure clearly shows spring cross hairs 760. While one end of suspension spring 330 is seated on spring receiving tab 670 of leading housing 250, the opposite end of suspension spring 330 is seated on spring cross hairs 760 of trailing housing 260.

FIG. 7D shows a sectional view of a preferred trailing housing in accordance with the present invention taken along line D—D of FIG. 7C. Over-drafted axle bore 720 is most clearly shown in this figure. The bore 720 is over-drafted toward the bottom of trailing housing 260 and tapers toward a center circular portion 770. This configuration, an axle bore over-drafted in one direction and tapering to a circular configuration in the middle of trailing housing 260 provides several advantages. This design allows the wheel axle 270 to rock back and forth across center circular portion 770 which allows the stroller to move more smoothly across uneven surfaces and improves handling. Furthermore, this configuration compensates for slight variances (due to manufacturing tolerances) in the location of transverse bore 5 of frame 2. Thus, if transverse bore 5 is not truly vertical, the ability of the wheel axle 270 to rock back and forth across center circular portion 770 will still allow both wheels 4 of a single swivel wheel assembly 3 to lie flat on the ground.

Now, the locking and unlocking of the swivel function of swivel wheel assembly 3 will be described in detail with reference to FIGS. 8 and 9.

Figure 8:
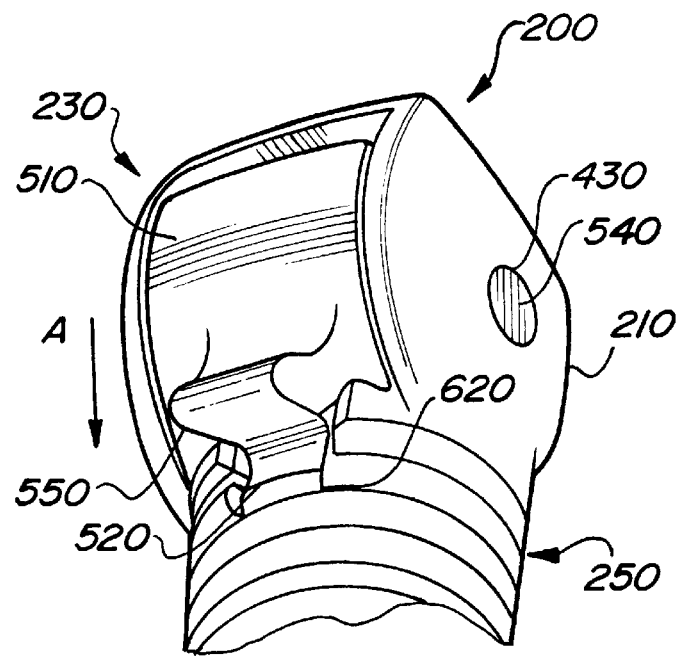
FIG. 8 is an isometric rear view of a portion of a preferred swivel wheel assembly in accordance with the present invention shown in the locked position.

FIG. 8 shows an isometric rear view of a portion of a preferred swivel wheel assembly in accordance with the present invention shown in the locked position. To lock the swiveling function, the swivel wheel assembly 3 must be rotated about swivel pin 220 until swivel latch receiving portion 620 of leading housing 250 is aligned with lock projection 520. In this position, swivel latch button 550 can then be moved in direction A. This movement causes lock projection 520 to engage swivel latch receiving portion 620 of leading housing 250 and thus swiveling of swivel wheel assembly 3 about swivel pin 220 is prevented. Swivel latch 230 is held in this locked position by swivel latch engaging tabs 460 and 470 until enough force is applied to swivel latch button 550 to overcome the spring bias of swivel latch engaging tabs 460 and 470.

Figure 9:
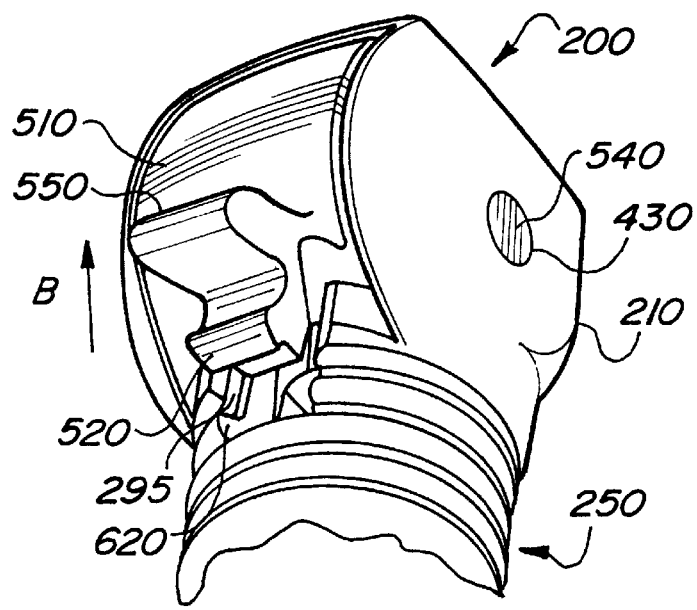
FIG. 9 is an isometric rear view of a portion of a preferred swivel wheel assembly in accordance with the present invention shown in the unlocked position.

FIG. 9 shows an isometric rear view of a portion of a preferred swivel wheel assembly in accordance with the present invention shown in the unlocked position. To unlock the swiveling function, swivel latch button 550 must be moved in direction B. This movement causes lock projection 520 to disengage from swivel latch receiving portion 620 of leading housing 250 and thus swiveling of swivel wheel assembly 3 about swivel pin 220 is enabled. Swivel latch 230 is held in this unlocked position by swivel latch engaging tabs 460 and 470 until enough force is applied to swivel latch button 550 to overcome the spring bias of swivel latch engaging tabs 460 and 470. Note that whether in the locked or unlocked position, swivel latch front face 510 remains flush with the surface of swivel mount 210.

Figure 10:
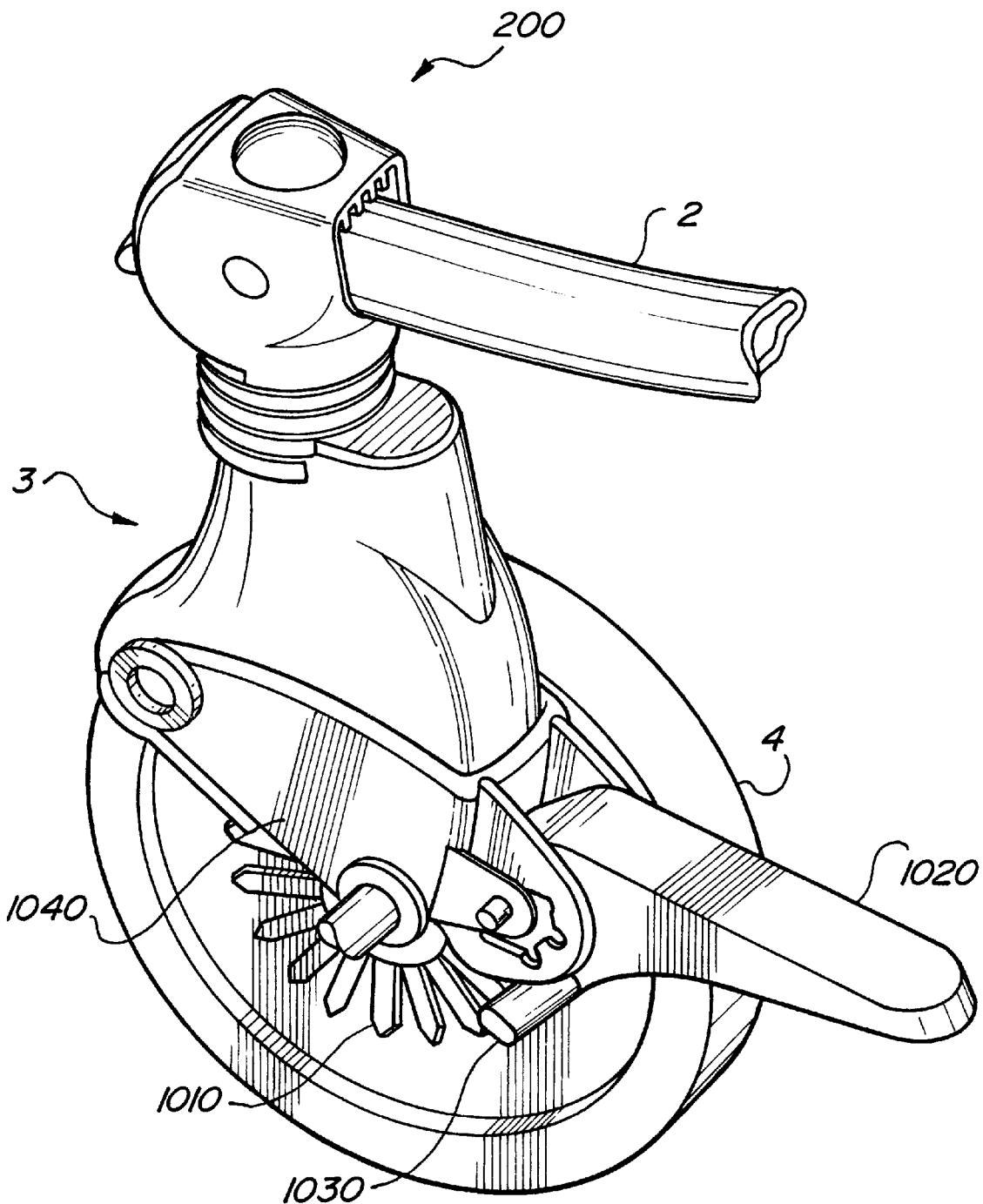
FIG. 10 is an enlarged isometric view of a portion of second preferred swivel wheel assembly in accordance with the present invention.

The wheel of the preferred stroller according to the present invention includes rotation prevention tabs (i.e. a cog wheel). Furthermore, the preferred stroller according to the present invention includes a wheel rotation brake lever adapted to be attached to the trailing housing and adapted to engage the wheel rotation prevention tabs to prevent rolling of the stroller. For example, FIG. 10 shows an enlarged isometric view of a portion of second preferred swivel wheel assembly in accordance with the present invention. This swivel wheel assembly includes wheel rotation prevention tabs 1010, wheel rotation brake lever 1020, brake lever projections 1030, and braking trailing housing 1040. When the distal end of wheel rotation brake lever 1020 is pushed downward, brake lever projections 1030 engage wheel rotation prevention tabs 1010 on wheel 4 to prevent the rolling of the stroller. When the distal end of wheel rotation brake lever 1020 is pulled upward, brake lever projections 1030 disengage from wheel rotation prevention tabs 1010 on wheel 4 and the rolling of the stroller is enabled. Wheel rotation prevention tabs 1010, wheel rotation brake lever 1020, brake lever projections 1030, and braking trailing housing 1040 may be constructed of any appropriate rigid material, preferably a high-strength plastic, and more preferably an injection-molded plastic.

Figure 11:
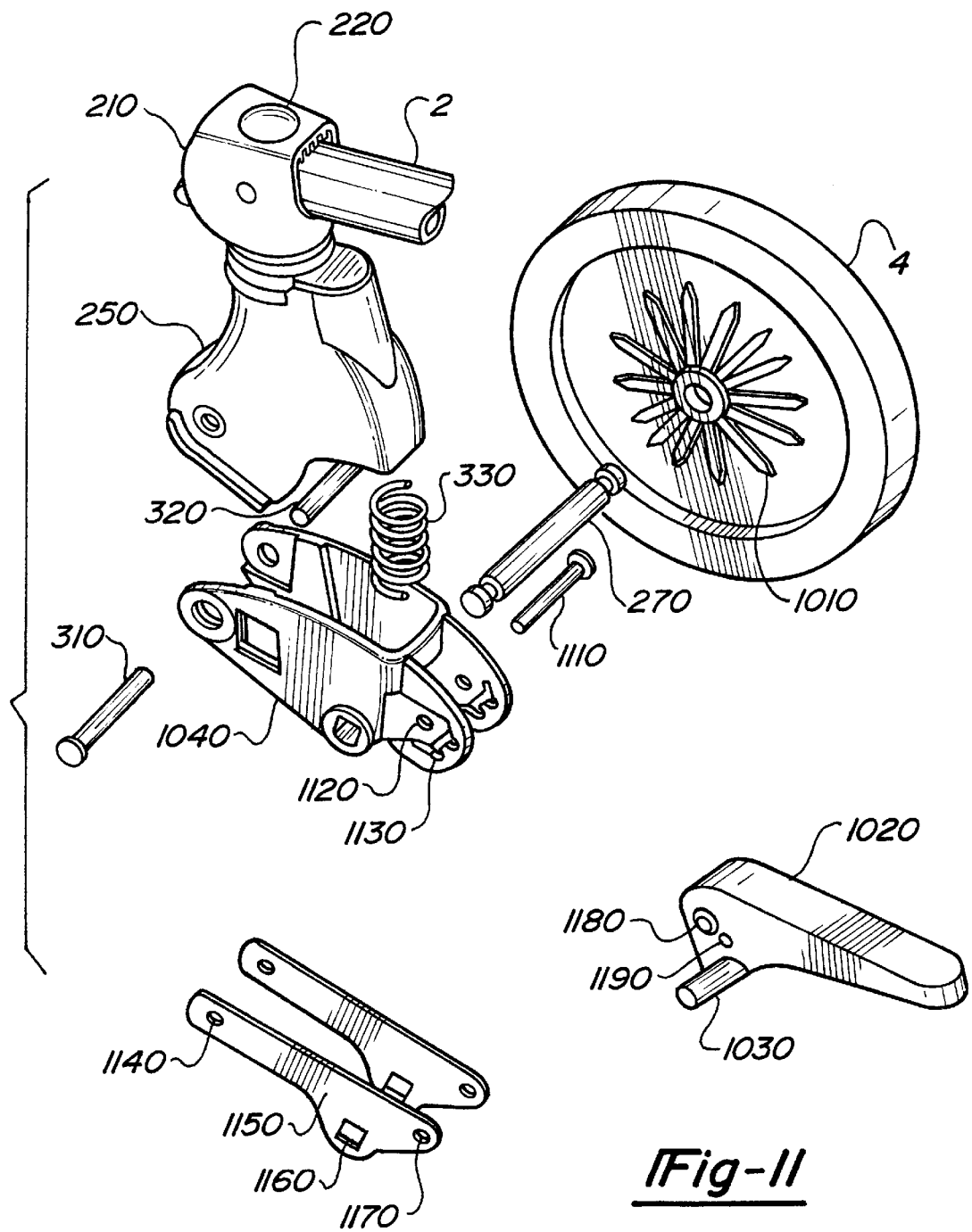
FIG. 11 is an exploded isometric view of a portion of a second preferred swivel wheel assembly in accordance with the present invention.

FIG. 11 is an exploded isometric view of a portion of a second preferred swivel wheel assembly in accordance with the present invention. Swivel mount 210 is adapted to receive a swivel pin 220 through a first bore, and an end of frame 2 and swivel latch 230 in a second bore. Swivel pin 220 is adapted to pass through transverse bore 5 of frame 2 (not shown in FIG. 11). Swivel bushing 300 (not shown in FIG. 11) is adapted to be sandwiched between swivel mount 210 and leading housing 250. Braking trailing housing 1040 is attached to leading housing 250 via suspension housing pin 310 and sleeve 320. Suspension spring 330 is received between leading housing 250 and braking trailing housing 1040. Wheel 4 is attached to braking trailing housing 1040 via wheel axle 270. Wheel rotation brake lever 1020 is attached to braking trailing housing 1040 via brake pin 1110. Brake pin 1110 passes through brake pin receiving bores 1120 and 1180 to hold wheel rotation brake lever 1020 in place. Brake lever tabs 1190 are received in brake tab receiving holes 1130. Furthermore, metal support braces 1150 are inserted in receiving slots within braking trailing housing 1040 (see FIG. 12). Metal support braces 1150 comprise suspension pin receiving holes 1140, axle receiving holes 1160, and brake pin receiving holes 1170. In operation, wheel rotation brake lever 1020 is held in locked and unlocked position via the positive interaction of brake lever tabs 1190 with brake tab receiving holes 1130.

Figure 12:
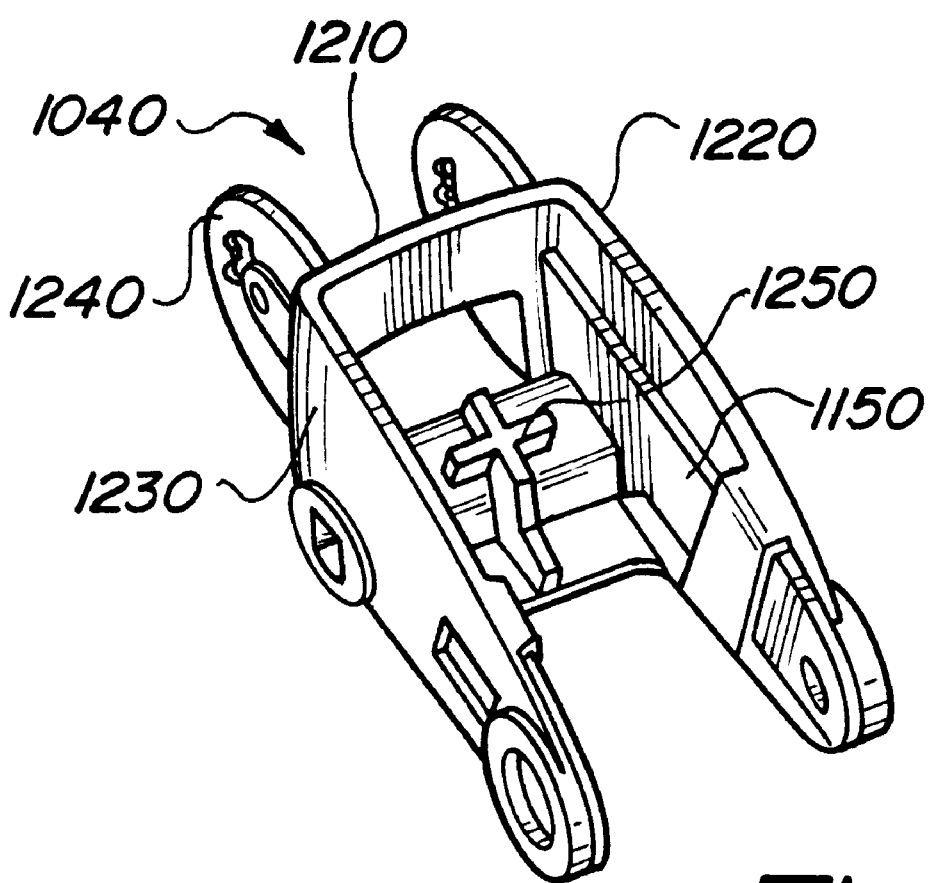
FIG. 12 is an isometric front view of a second preferred trailing housing in accordance with the present invention.

Braking trailing housing 1040 is shown in greater detail in FIG. 12. Braking trailing housing 1040 includes rear portion 1210, side portions 1220 and 1230, rear extensions 1240, and spring cross hairs 1250. As can be seen in this Fig., metal support braces 1150 are inserted in receiving slots within braking trailing housing 1040 to provide the increased structural rigidity necessary to support the operation of wheel rotation brake lever 1020.

It will be apparent to those skilled in the art that various modifications and variations can be made in the stroller and swivel wheel mount assembly of the present invention without departing from the spirit or scope of the invention. Thus, it is intended that the present invention cover the modifications and variations of this invention provided they come within the scope of the appended claims and their equivalents.

What is claimed is:

1. A stroller comprising:

a frame member;

a swivel mount adapted to receive said frame member;

a swivel latch adapted to be received in said swivel mount;

a suspension housing comprising a swivel latch receiving portion, said suspension housing adapted to be attached to said swivel mount;

a swivel pin adapted to be received in said frame member, said swivel mount, and said suspension housing; and at least one wheel pivotally attached to said frame member.

2. The stroller of claim 1, wherein said frame member defines a bore extending transversely therethrough.

3. The stroller of claim 2, wherein said swivel mount defines first and second bores, said first bore extending completely through said swivel mount and said second bore extending at least partially through said swivel mount, wherein said second bore is perpendicular to said first bore and is adapted to receive an end of said frame member and said swivel latch.

4. The stroller of claim 3, wherein said swivel mount further comprises swivel latch engaging tabs to engage said swivel latch in an open position and a locked position, wherein in the locked position, said swivel latch receiving portion of said suspension housing receives said swivel latch.

5. The stroller of claim 3, wherein said suspension housing further comprises a swivel pin receiving portion.

6. The stroller of claim 5, wherein said swivel pin is adapted to be received in said frame member transverse bore, said first bore of said swivel mount, and said swivel pin receiving portion of said suspension housing.

7. The stroller of claim 1, wherein said suspension housing further comprises a leading housing and a trailing housing.

8. The stroller of claim 7, wherein said suspension housing further comprises a spring received between said leading housing and said trailing housing.

9. The stroller of claim 7, wherein said trailing housing defines an over-drafted axle bore adapted to receive an axle.

10. The stroller of claim 7, wherein said at least one wheel comprises rotation prevention tabs.

11. The stroller of claim 10, further comprising a wheel rotation brake lever adapted to be attached to said trailing housing and adapted to engage said wheel rotation prevention tabs to prevent rolling of the stroller.

12. A swivel wheel mount assembly, adapted to be mounted to a structure, comprising:

a swivel mount adapted to receive a portion of the structure;

a swivel latch adapted to be received in said swivel mount;

a suspension housing comprising a swivel latch receiving portion, said suspension housing adapted to be attached to said swivel mount; and a swivel pin adapted to be received in said portion of the structure, said swivel mount, and said suspension housing, wherein the swivel mount assembly is adapted to pivotally attach at least one wheel to said portion of the structure.

13. The swivel wheel mount assembly of claim 12, wherein said swivel mount defines first and second bores, said first bore extending completely through said swivel mount and said second bore extending at least partially through said swivel mount, wherein said second bore is perpendicular to said first bore and is adapted to receive said portion of the structure and said swivel latch.

14. The swivel wheel mount assembly of claim 13, wherein said swivel mount further comprises swivel latch engaging tabs to engage said swivel latch in an open position and a locked position, wherein in the locked position, said swivel latch receiving portion of said suspension housing receives said swivel latch.

15. The swivel wheel mount assembly of claim 13, wherein said suspension housing further comprises a swivel pin receiving portion.

16. The swivel wheel mount assembly of claim 15, wherein said swivel pin is adapted to be received in a transverse bore in said portion of the structure, said first bore of said swivel mount, and said swivel pin receiving portion of said suspension housing.

17. The swivel wheel mount assembly of claim 11, wherein said suspension housing further comprises a leading housing and a trailing housing.

18. The swivel wheel mount assembly of claim 17, wherein said suspension housing further comprises a spring received between said leading housing and said trailing housing.

19. The swivel wheel mount assembly of claim 17, wherein said trailing housing defines an over-drafted axle bore adapted to receive an axle.

20. The swivel wheel mount assembly of claim 17, further comprising a wheel rotation brake lever adapted to be attached to said trailing housing and adapted to prevent rolling of the structure.

* * * * *